United States Patent [19]

Beck et al.

[11] Patent Number: 4,491,777

[45] Date of Patent: Jan. 1, 1985

[54] POSITION CONTROL OF FABRICATING MATERIALS

[75] Inventors: Thomas L. Beck, Union Grove; Donald B. Lawson, South Milwaukee, both of Wis.

[73] Assignee: Unico, Inc., Franksville, Wis.

[21] Appl. No.: 348,491

[22] Filed: Feb. 12, 1982

[51] Int. Cl.³ .............................................. G05B 19/24
[52] U.S. Cl. ..................................... 318/571; 318/135; 318/687; 364/469; 198/805
[58] Field of Search ..................... 318/571, 687, 135; 364/469, 472; 198/805

[56] References Cited

U.S. PATENT DOCUMENTS

| 385,775 | 7/1888 | Roberts | 193/12 |
|---|---|---|---|
| 1,441,250 | 1/1923 | Smith | 221/155 |
| 2,561,377 | 7/1951 | Jones | 198/619 |
| 2,609,915 | 9/1952 | DeBurgh | 198/41 |
| 2,622,745 | 12/1952 | Roe | 214/1 |
| 2,684,753 | 7/1954 | Kolbe et al. | 198/203 |
| 2,767,823 | 10/1956 | Beamish | 198/41 |
| 2,783,684 | 3/1957 | Yoler | 89/7 |
| 2,915,973 | 12/1959 | Findlay | 103/1 |
| 2,940,583 | 6/1960 | Lovercheck | 198/41 |
| 3,113,042 | 12/1963 | Hall | 118/637 |
| 3,120,891 | 2/1964 | Cmiel | 198/41 |
| 3,132,858 | 5/1964 | Bernard, Jr. | 271/68 |
| 3,163,785 | 12/1964 | Rosaen | 310/12 |
| 3,167,168 | 1/1965 | Park | 198/31 |
| 3,185,909 | 5/1965 | Jahn | 318/135 |
| 3,202,405 | 8/1965 | Tack | 266/5 |
| 3,263,796 | 8/1966 | Parke | 198/41 |
| 3,282,395 | 11/1966 | Crotty | 198/33 |
| 3,333,124 | 7/1967 | Francis et al. | 310/13 |
| 3,352,397 | 11/1967 | Becker et al. | 193/35 |
| 3,443,677 | 5/1969 | Tribe | 198/184 |
| 3,456,136 | 7/1969 | Pierro | 310/12 |
| 3,468,406 | 9/1969 | Spodig | 198/5 |
| 3,482,124 | 12/1969 | Pelenc | 310/12 |
| 3,493,160 | 2/1970 | Sumrall et al. | 226/188 |
| 3,554,670 | 1/1971 | Von Starck et al. | 417/50 |
| 3,610,695 | 10/1971 | Yabuta | 302/29 |
| 3,616,978 | 11/1971 | Haslam | 226/93 |
| 3,632,229 | 1/1972 | vonStarck | 417/50 |
| 3,662,635 | 5/1972 | Yabuta | 83/23/35 |
| 3,675,757 | 7/1972 | Yabuta | 198/41 |
| 3,692,168 | 9/1972 | Hughes, Jr. et al. | 198/41 |
| 3,754,634 | 8/1973 | Gerbig et al. | 198/41 |
| 3,760,245 | 9/1973 | Halvorsen | 318/38 |
| 3,788,447 | 1/1974 | Stephanoff | 198/41 |
| 3,873,014 | 3/1975 | Matsuhisa | 226/162 |
| 3,882,981 | 5/1975 | Izumidate et al. | 193/40 |
| 3,891,907 | 6/1975 | Lenzkes et al. | 318/369 |
| 3,904,898 | 9/1975 | Mailfert | 310/12 |
| 3,904,941 | 9/1975 | Matsui et al. | 318/135 |
| 3,906,261 | 9/1975 | Ogura et al. | 310/12 |
| 3,924,146 | 12/1975 | George | 310/36 |
| 3,950,661 | 4/1976 | Langmuir | 310/12 |
| 4,051,398 | 9/1977 | Kondo | 310/12 |
| 4,264,957 | 4/1981 | Pautzke | 364/469 |
| 4,368,413 | 1/1983 | Tazaki | 318/687 |
| 4,381,478 | 4/1983 | Saijo et al. | 318/135 |
| 4,404,634 | 9/1983 | Bautz | 364/472 |

OTHER PUBLICATIONS

"Linear Induction Motors"—*Northern Magnetics, Inc.*—Reprinted from *Machine Design*, Mar. 19, 1970.
"Polynoid Linear Actuator" from design bulletin No. 2—*Northern Magnetics, Inc.*
"Polynoid Linear Actuator" form design bulletin No. 1—*Northern Magnetics, Inc.*
"Nor Mag", Design Bulletin No. 4, *Northern Magnetics, Inc.*

*Primary Examiner*—B. Dobeck
*Attorney, Agent, or Firm*—Barry E. Sammons

[57] ABSTRACT

Linear motors are employed to position fabricating materials in work stations. The fabricating material forms the movable element of the linear motor and the positioning of the fabricating material is precisely controlled by a closed loop positioning control system which drives the stator windings of the linear motor. Two embodiments are disclosed; one for sheet metal and the other for tubular metal.

14 Claims, 13 Drawing Figures

POSITION CONTROL OF FABRICATING MATERIALS

BACKGROUND OF THE INVENTION

The field of the invention is motor drives for positioning materials at a work station, and particularly, the movement and positioning of metal during high speed manufacturing processes.

Many articles are formed from sheets or tubes of metal which are cut and shaped in high speed automated manufacturing processes. For example, sheet steel may be removed from a roll, cut into pieces, and formed into automobile fenders, refrigerator doors, or the like, at a rate of fifty or sixty per minute. The movement of the metal fabricating material is accomplished using rollers or belts which are driven by conventional a.c. or d.c. rotary electric motors. The rotary motors drive the rollers or belts through a mechanical drive train which may include shafts and gears of various sizes and shapes. The rotary motors are controlled by drive circuits which determine the direction and speed of rotation. Feedback devices such as pulse generators may also be employed with such drive circuits to form closed loop position controls that enable the system to rapidly move the fabricating material and precisely position it in a work station.

There are a number of difficulties with conventional motor drive systems for high speed metal fabricating processes. First, the rollers or belts employed to propel the fabricating material can mar the surface of the material. This is a major problem when soft metals such as aluminum are used, or when the fabricating material is subjected to high acceleration and deceleration forces. To minimize such problems, the surface area of the driving elements is often increased to distribute the driving force over the surface of the facricating material. This requires larger, or additional rollers, which in turn increases the size of the drive train from the rotary motors. The mass of the drive train and rollers may exceed that of the driven fabricating material. As a result, the drive motor and its control circuits must be substantially increased in size to meet the desired acceleration and deceleration specifications.

Linear motors have long been used in industry to propel fabricating materials along conveyors. Sheet metal has been driven along a conveyor by linear motor windings located beneath the conveyor and along its length. As disclosed in U.S. Pat. No. 3,610,695 for example, photo detectors are placed along the length of the linear motor conveyor and as the sheet metal passes, additional segments of the linear motor are energized to propel the material onward. When the sheet material reaches a work station it is propelled against mechanical stops which position it as described in U.S. Pat. No. 3,662,625. A similar structure in which the linear motor stator windings encircle the tubular material is disclosed in U.S. Pat. No. 3,616,978.

The use of linear motors in prior processes has been limited to the simple function of providing a propelling force to the fabricating material. Such a propelling force may position the fabricating material only in the sense that it propels the material against mechanical positioning mechanisms, or allows the material to come to a halt after passing a selected position on a conveyor.

SUMMARY OF THE INVENTION

The present invention relates to a position control in which the fabricating material forms the movable element of the motor which drives it. More specifically, stator windings are positioned along the path of the fabricating material and are supplied with a polyphase current which produces a moving magnetic wave that induces current in the material and produces a force that propels the fabricating material. A position sensing device is mounted to detect the motion of the fabricating material and to generate a position feedback signal to a position control circuit. The position control circuit controls the polyphase currents applied to the stator windings to thereby control the position of the fabricating material in response to both a position command and the position feedback signal.

A general object of the invention is to accurately and rapidly drive fabricating materials without marring their surfaces. The force which propels the fabricating material is caused by the interaction of the currents induced in the material and the traveling magnetic wave produced by the stator windings. Very high accelerating and decelerating forces can thus be induced in the fabricating material without engaging its surface. The polyphase currents applied to the stator windings are precisely controlled by the closed-loop position control circuit, and hence, the fabricating material can be rapidly and precisely moved through a manufacturing process without damage to its surfaces or edges.

Another object of the invention is to reduce the energy required to process fabricating materials. By employing the fabricating material itself as the "rotor" element in an induction motor, the mechanical drive mechanism employed in conventional drive systems is eliminated. This considerably reduces the mass to be driven, and hence, the energy required to propel the fabricating material through the fabricating process.

Yet another object of the invention is to reduce the cost of the drive system. A large savings is achieved directly by eliminating the considerable mechanical structures required to drive fabricating materials in prior systems. In addition, because these massive mechanical structures are eliminated, the size of the motor drive circuit components can be reduced.

Another object of the invention is to rapidly position fabricating materials in a work station without the use of mechanical stops or other devices which engage the material and guide it into position. By employing a closed-loop position control system to drive the fabricating material, its precise position can be controlled without mechanical means. In addition, the acceleration and deceleration of the material from and to the desired positions can be controlled to speed up the fabricating process.

Yet another object of the invention is to eliminate inaccuracies due to slippage between the fabricating material and conventional drive mechanisms. No mechanical engagement is required when the present invention is employed since the propelling and positioning forces are electromagnetically induced in the fabricating material.

The foregoing and other objects and advantages of the invention will appear from the following description. In the description, reference is made to the accompanying drawings which form a part hereof, and in which there is shown by way of illustration a preferred embodiment of the invention. Such embodiment does

3 not necessarily represent the full scope of the invention, however, and reference is made therefore to the claims herein for interpreting the scope of the invention.

BRIEF DESCRIPTION OF THE DRAWINGS

FIGS. 7A–7C are flow charts which illustrate the manner in which the position control of FIG. 5 operates the a.c. motor drive to control the systems of FIGS. 1 and 2.

DESCRIPTION OF THE PREFERRED EMBODIMENTS

Figure 1:
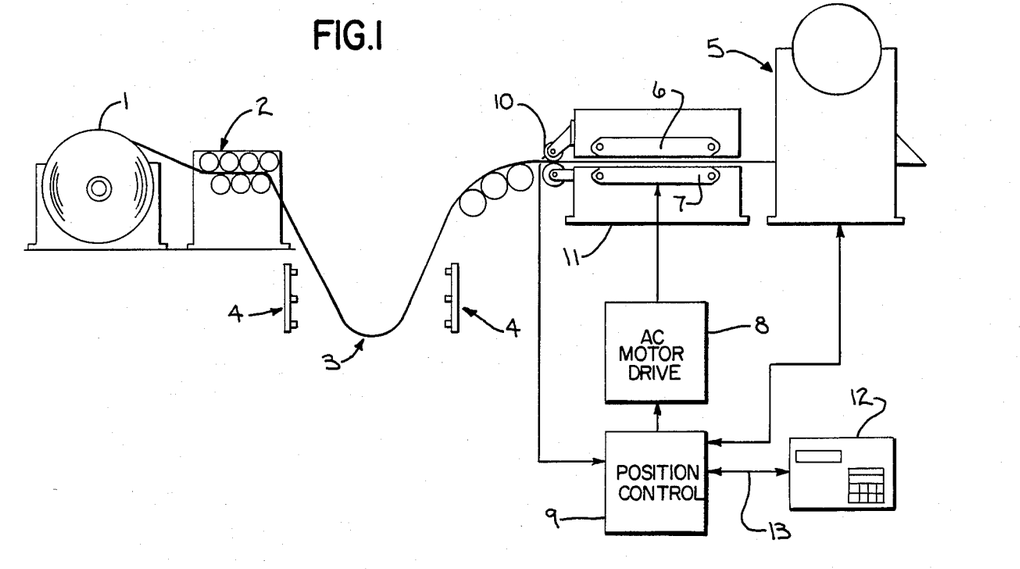
FIG. 1 is a schematic diagram of a system which employs a first preferred embodiment of the invention.

Referring particularly to FIG. 1, a first preferred embodiment of the invention is employed to feed sheet material into a work station. The sheet material is in a roll 1 which is payed off to a series of rollers 2 which operate as a straightener. The sheet material 1 is electrically conductive and is typically steel or aluminum. The sheet material 1 is payed off at a relatively constant rate and it is allowed to accumulate in a loop 3. Photo sensors 4 operate to provide feedback signals to a motor drive system (not shown in the drawings) which controls the rate at which the sheet material 1 is payed off the roll.

A work station 5 receives the sheet material 1 and performs an operation on the material. Typical machines include presses, blankers and shears in which a preselected amount of sheet material 1 is rapidly transferred into the work station 5, decelerated to a stationary position, operated upon, and transferred on to the next work station (not shown in the drawings). To provide the driving force which moves the sheet material 1 into the work station 5, a pair of flat linear motors 6 and 7 are mounted adjacent the input side of the work station 5. The linear motors 6 and 7 are substantially identical. The motor 6 is positioned above the sheet material 1 with its pole faces directed downward and the linear motor 7 is positioned beneath the sheet material 1 with its pole faces directed upward. To be more precise, the linear motors 6 and 7 form only the stator windings of a linear motor since the sheet material 1 acts as the movable element, or "rotor".

An a.c. motor drive 8 supplies current to the windings of the linear motors 6 and 7 to establish a magnetic field that moves in the direction of the work station 5. This moving magnetic field interacts with the currents it induces in the sheet material 1 to provide a driving force. By controlling the phase order and the magnitude of the currents applied to the linear motors 6 and 7, and the direction of the moving magnetic field which they produce, the position, velocity and acceleration of the sheet material 1 can be precisely controlled.

Referring still to FIG. 1, operation of the a.c. motor drive 8 is controlled by a position control circuit 9. The position control circuit 9 receives position feedback data from a pulse generator 10 that is mechanically mounted to the framework 11 which supports the linear motors 6 and 7. The pulse generator 10 is rotated by the sheet material 1 as it passes by the point of engagement, and voltage pulses at the rate of 1000 pulses per inch of sheet material are fed back to the position control 9. A programming panel 12 also connects to the position control circuit 9 through a serial data link 13. Using the programming panel 12, the position control 9 is programmed by the operator to move the sheet material 1 into the work station 5 a preselected distance and then operate the machine 5. In addition, the rate at which the sheet material 1 is translated (velocity) can be controlled, as well as the rate of its acceleration and deceleration when setting it into motion and bringing it to a stop. A closed loop positioning system is thus formed.

Figure 2:
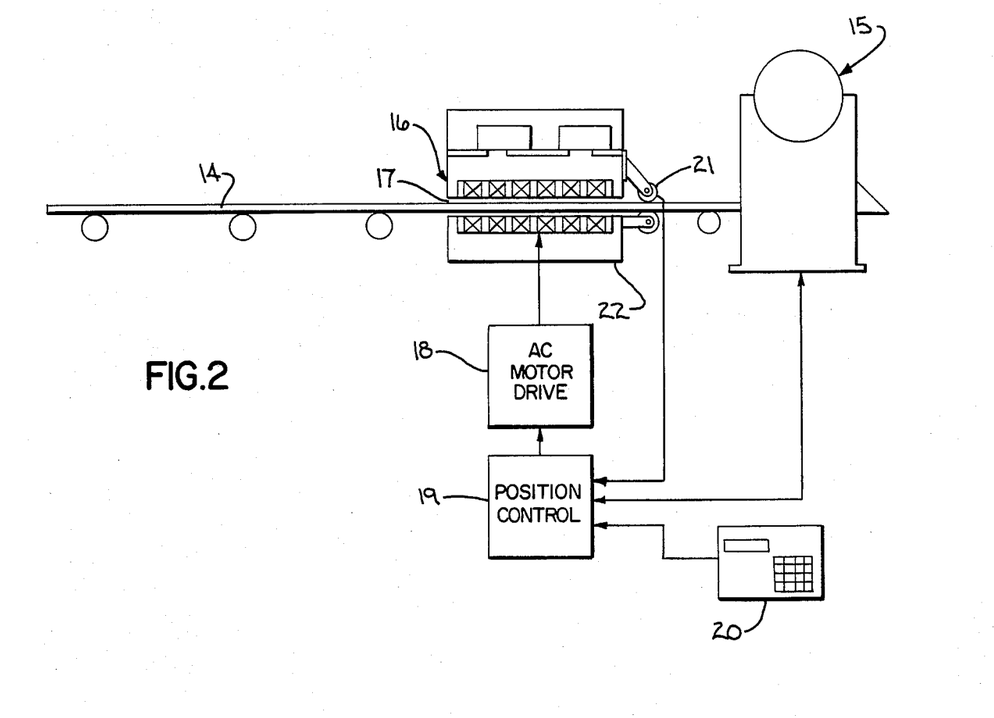
FIG. 2 is a schematic diagram of a system which employs a second preferred embodiment of the invention.

Referring particularly to FIG. 2, a closed loop positioning control system may be used with other linear motor configurations to directly control the transfer of fabricating materials into a work station. The second preferred embodiment of the invention feeds tubular material 14 into a work station 15 where it is operated upon. The tubular material may be, for example, steel, aluminum, copper or iron pipe which is being cut to precise lengths or bent into specified shapes. A cylindrical shaped linear motor 16 is mounted at the input side of the work station 15 and the tubular material 14 passes through a circular opening 17 in the motor 16. As will be described in more detail below, the cylindrical linear motor 16 is comprised of a series of coils which are distributed along its axial length and which each completely encircle the tubular material 14. When these coils are driven by an a.c. motor drive 18, a magnetic field moves along the axial length of the linear motor 16 and this induces currents in the tubular material 14 which interact with the moving magnetic field to generate a driving force.

As with the planar motor 6 and 7, the driving force induced in the fabricating material can be controlled by the magnitude and phase order of the current supplied by the a.c. motor drive 18. The a.c. motor drive 18 is in turn controlled by a position control circuit 19 which stores commands received from a programming panel 20 and which receives position feedback pulses from a pulse generator 21. The pulse generator 21 is mounted to the framework 22 which supports the linear motor 16, and it is positioned to engage the tubular material 14 as it is fed into the work station 15.

The electronic circuitry, including the a.c. motor drives 8 and 18, position control circuits 9 and 19, programming panels 12 and 20, and the pulse generators 10 and 21, are substantially the same in both preferred embodiments of the invention. The primary distinction between the two embodiments is the physical shape and construction of the linear motors 6, 7 and 16. In both embodiments the fabricating material forms the movable element in a linear motor structure and this movable element is precisely controlled by a closed loop positioning system which drives the stator windings of the linear motor.

Figure 3A:
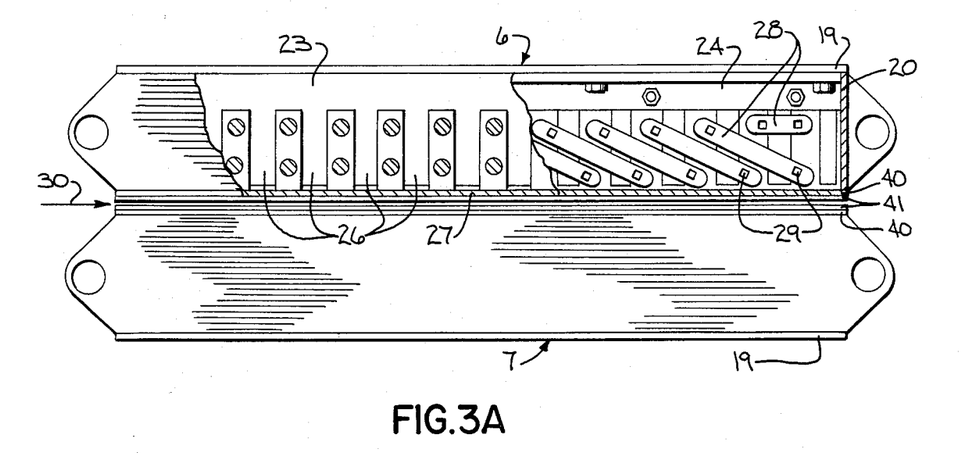
FIG. 3A is an elevation view with parts cut away of a linear motor which forms part of the system of FIG. 1.
Figure 3B:
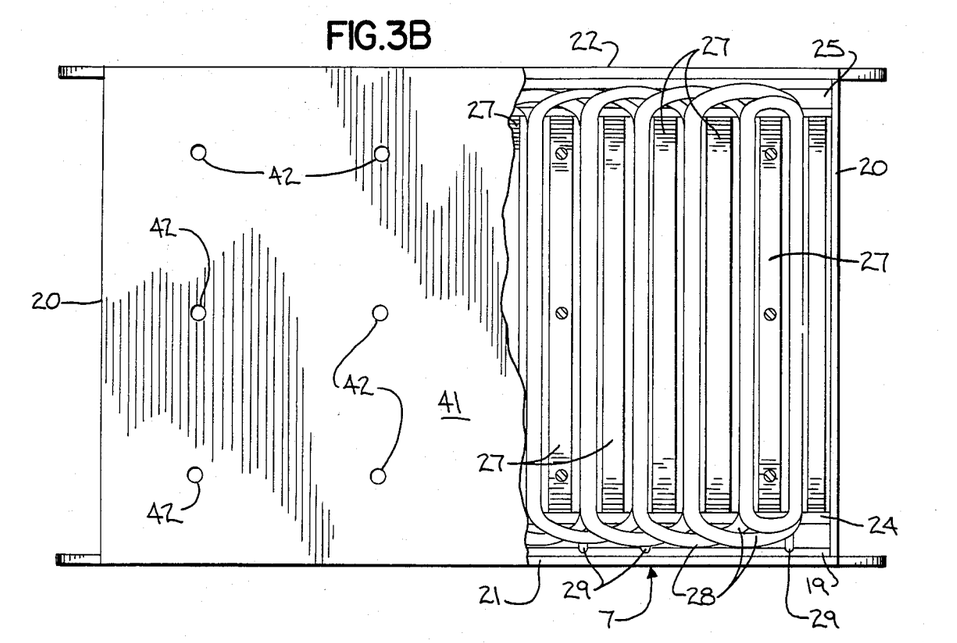
FIG. 3B is a top view of the lower stator winding which forms part of FIG. 3A.
Figure 3C:
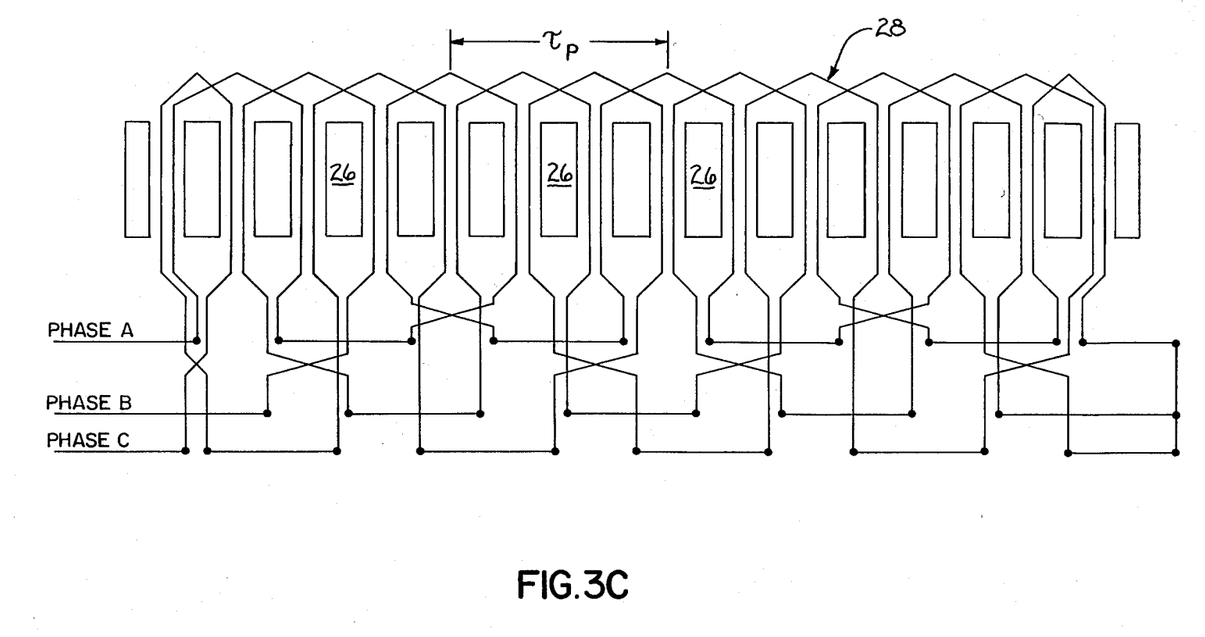
FIG. 3C is a schematic representation of the stator windings and connections for the linear motor of FIG. 3A.

Referring particularly to FIGS. 3A–3C, the flat linear motors 6 and 7 include a rectangular metal enclosure having a base plate 19, upright front and back walls 20 and upright left and right side walls 21 and 22. A magnetic circuit 23 formed by laminating together thin sheets of magnetic steel is attached to the base plate 19 by angle irons 24 and 25 which extend along the length of the side walls 21 and 22. The laminations are shaped to form teeth 26 which extend away from the base plate 19 and which define pole faces 27 at their ends. The teeth 26 extend the entire lateral extent of the motors 6 and 7 and they define slots between them which receive stator windings 28. Each stator winding 28 has a pair of terminals 29 which connect to its ends, and the terminals 29 are connected to the three output phases A, B and C of the a.c. motor drive 8. The specific connections are shown in FIG. 3C for the upper linear motor 6. The lower linear motor 7 is wired in a similar fashion, but all connections to the individual windings 28 are reversed so that the magnetic flux generated by corresponding windings in the linear motors 6 and 7 are substantially in phase. The forces induced in the sheet material 1 by each linear motor 6 and 7 are thus additive.

By connecting the stator windings as shown and exciting them with three-phase sinusoidal current, a magnetic wave which runs, or travels, in the direction indicated by vector 30 is generated. The velocity of the running magnetic wave is determined by the product of the frequency of the applied current and the spacing of the pole faces 27 (Velocity=$\tau 2Fp$). This magnetic wave induces an emf in the conductive fabricating material and the emf causes a current to flow. The induced current in the fabricating material interacts with the running magnetic wave to produce a force that powers the sheet material 1 toward the work station 5. The magnitude of this induced force is a function of the stator winding current. Various other stator winding connections will produce this running magnetic wave, and indeed, the windings can also be connected to produce such a moving wave from a two-phase a.c. motor drive.

The pole faces 27 on each linear motor 6 and 7 are covered by a sheet of stainless steel 40. This is in turn covered with a thin sheet of bearing material 41 which is held in place by countersunk screws 42. The spacing between the two motors 6 and 7 can be adjusted to accommodate sheet materials of various thicknesses. This spacing should be as close as possible, but it should allow free movement of the sheet material 1.

Figure 4A:
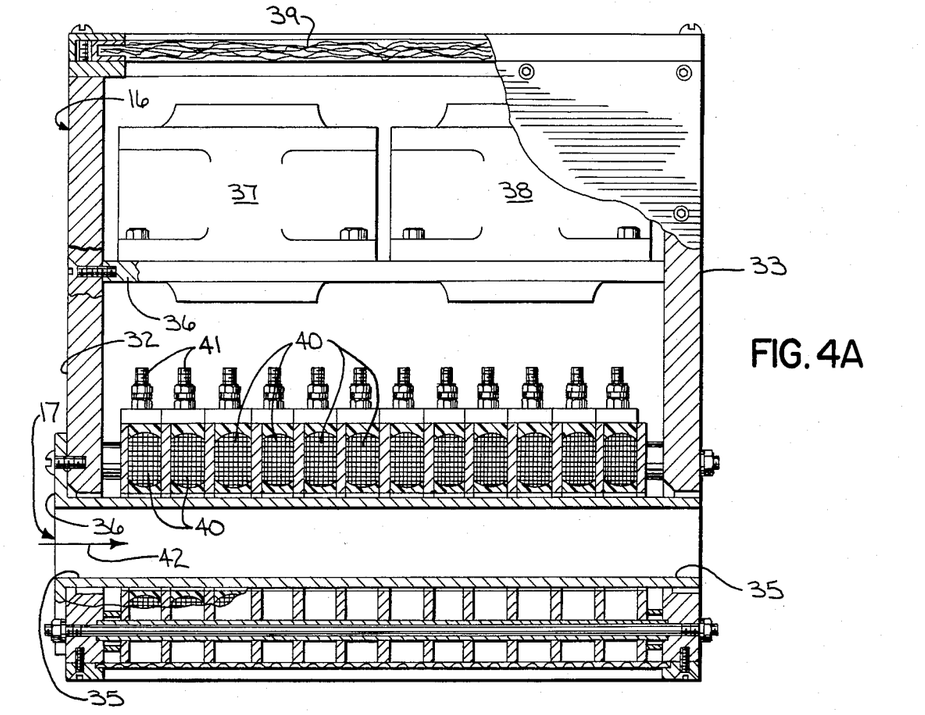
FIG. 4A is an elevation view with parts cut away of a linear motor employed in the system of FIG. 2.
Figures 4B, 4C:
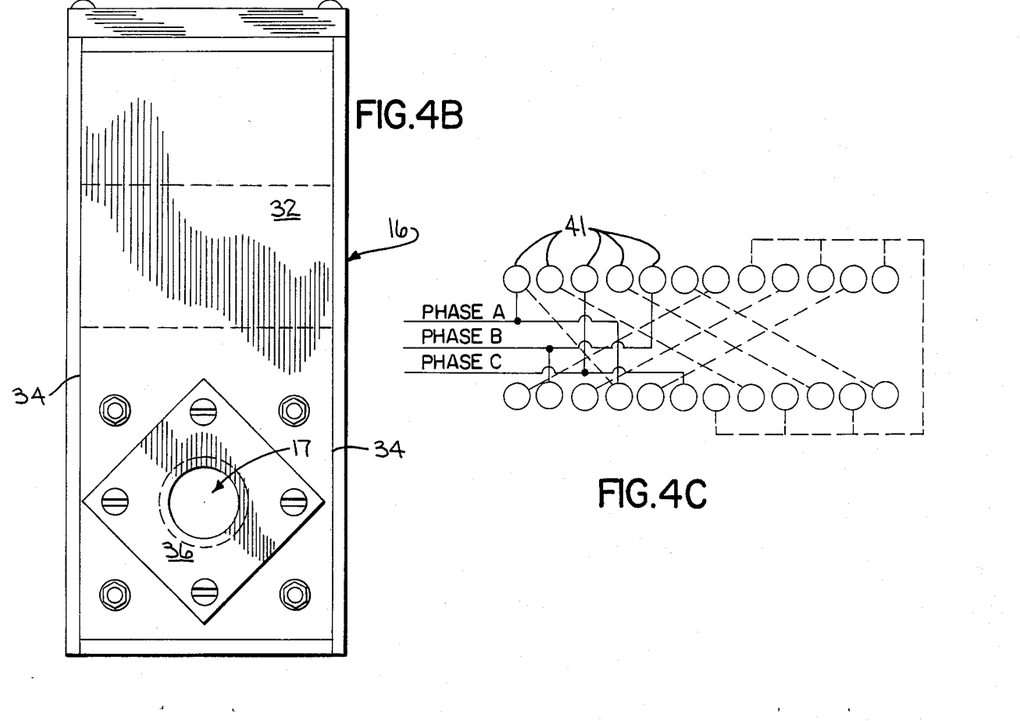
FIG. 4B is a front elevation view of the linear motor of FIG. 4A.
FIG. 4C is a schematic representation of the stator coil connections for the linear motor of FIG. 4A.

Referring particularly to FIGS. 4A–4C, the cylindrical linear motor 16 includes a housing having a front wall 32, back wall 33 and a pair of spaced side walls 34. The circular opening 17 through which the tubular fabricating material is driven extends between the front and back walls 32 and 33, and it is defined by a stainless steel guide tube 35. A flange 36 is formed on the front end of the guide tube 35 and it is bolted to the front wall 32 to hold the tube 35 securely in place. The guide tube 35 can easily be changed to accommodate tubular fabricating materials of different sizes.

The interior of the motor housing is divided into two portions by a wall 36, and a pair of fans 37 and 38 are mounted in the upper portion. An air filter 39 is fastened above the fans 37 and 38 and cooling air is pulled into the housing through this filter 39 and directed downward to the lower portion. The fans 37 and 38 enable the cooling air to be circulated through the housing despite the orientation of the housing. As a result, the linear motor 16 may be rotated ninety degrees and mounted on one of its sides 34 as required.

Referring still to FIGS. 4A–4C, the stator windings for the linear motor 16 are comprised of twelve toroidal shaped coil modules 40 which are stacked together along the length of the guide tube 35. Each coil module 40 is comprised of a single coil containing windings which extend completely around the guide tube 35. The ends of each coil are terminated at terminal posts 41 mounted to the top of each coil module 40. The connection of the three phase outputs to the terminal posts 41 is shown by the solid lines in FIG. 4C and the connection of the terminal posts 41 to one another is shown by the dashed lines. As with the flat motors 6 and 7, the purpose of these connections is to generate a magnetic wave which smoothly moves along the length of the guide tube 35 in the direction indicated by vector 42. This magnetic wave induces a force on the tubular material within the opening 17 that feeds it toward the work station 15. Numerous other coil connections will achieve this result, and the particular connections used may be determined in large part by the maximum voltage and current levels which can be delivered by the AC motor drive 18.

Figure 5:
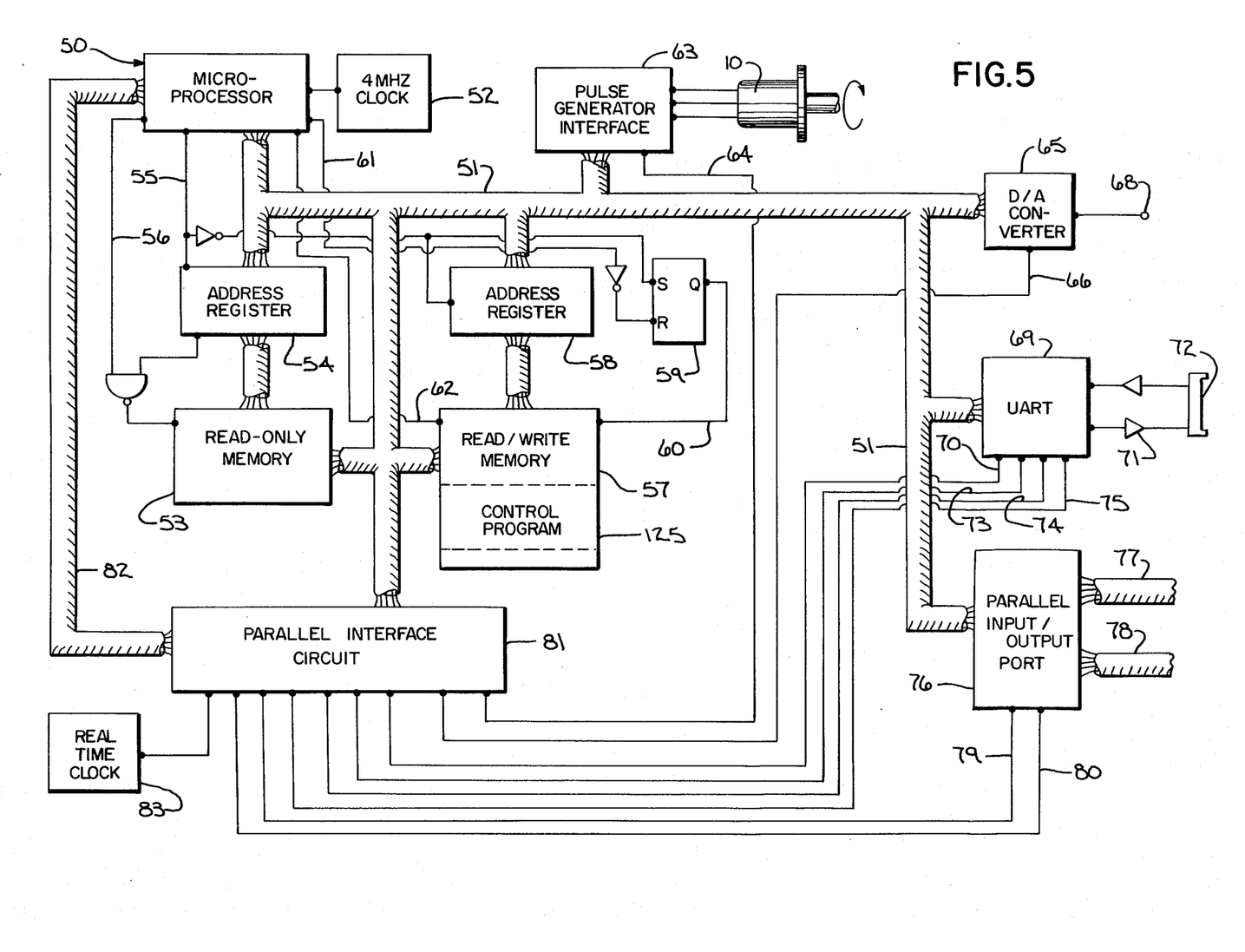
FIG. 5 is a schematic diagram of the position control which forms part of the systems of FIGS. 1 and 2.

Referring particularly to FIG. 5, the position control circuits 9 and 19 are identical and each is structured around a CMOS 12-bit microprocessor 50 which is manufactured by Intersil, Inc. as part number IM6100. The microprocessor 50 is coupled to the other elements of the position control system through a 12-bit bus 51 and a set of control lines. The microprocessor 50 is driven with a 4 megahertz clock 52 and it operates in response to 12-bit instructions which are stored in a read-only memory 53. Such an instruction is fetched by generating a memory address on the bus 51 which is then latched in an address register 54 when an LXMAR control line 55 becomes active. This latched address is applied to the read-only memory 53, and when a CPSEL control line 56 then becomes active, the instruction at the address in the read-only memory 53 is read out onto the bus 51 and into the instruction register of the microprocessor 50.

The data which is operated upon by the microprocessor 50 is stored in a read/write memory 57. The address terminals of the read/write memory are coupled to the bus 51 through an address register 58, and when the LXMAR control line 55 becomes active during a memory read or write operation, an address is latched in the register 58 and applied to these terminals. Simultaneously, an RS flip-flop 59 is set by the active LXMAR control line 55 to generate a memory read state on a read/write control line 60. An XTC control line 61 also becomes active and when data is to be written to the memory 57, the flip-flop 59 is reset to generate a write signal on the control line 60. The memory 57 is enabled by a MEMSEL control line 62 and data is either read out of the memory 57 onto the bus 51 or written into the addressed memory location.

The microprocessor 50 executes instructions stored in the read-only memory 53 to input data from various source devices, perform calculations on such data, and output the results to various destination devices. One of the sources of data is a pulse generator interface circuit 63 which connects to the bus 51 and which receives electronic pulses from the pulse generator 10. Each pulse represents an increment of distance and these are accumulated in a bi-directional counter (not shown in the drawings). The counter is incremented when the pulse generator rotates in one direction and it is decremented when rotated in the reverse direction. The accumulated count is read onto the bus 51 as a 12-bit binary number when an MPG control line 64 becomes active. By periodically reading in data from the pulse generator interface 63, the position control 9 maintains an accurate indication of the distance the fabricating material moves, its velocity and its acceleration. The position feedback loop is closed in this manner every 5.5 milliseconds.

Referring still to FIG. 5, the position control 9 drives the a.c. motor control 8 with an analog command signal that represents the difference between actual velocity and desired velocity. This velocity error signal is generated by a 12-bit digital-to-analog converter circuit 65 which has its inputs connected to the bus 51. When an OUT DAC control line 66 becomes active a 12-bit binary velocity error number is written to the D/A converter circuit 65 which generates the corresponding analog signal on an output line 68 to the a.c. motor drive 8 or 18.

Communications with the programming panel 12 is accomplished through a universal asynchronous receiver/transmitter (UART) 69 which has its data terminals connected to the bus 51. When an OUT XMR control line 70 is active, an eight-bit data byte is written into the UART 69 and is transmitted serially through an output buffer 71 to a connector 72. When the transmission is complete, an XMR FLG control line 73 is driven low by the UART 69. The connector 72 connects with the serial data link 13 leading to the programming panel. An RS232C protocol is implemented, and thus a wide variety of commercially available terminals and printers may be employed as the programming panel 12.

When a byte of data is received by the UART 69 from the programming panel 12, an RCR FLG control line 74 is driven high. The microprocessor 50 is programmed to respond by driving an INPUT RCR control line 75 active and to read the received byte from the UART 69. The communication with the programming panel 12 is thus under the control of the microprocessor 50.

A parallel input/output port 76 connects to the bus 51 to drive a 12-bit output bus 77 and receive data from a 12-bit input bus 78. The bus 78 connects through appropriate interface circuits (not shown in the drawings) to input devices such as limit switches and control panel switches on the machinery associated with the work station 5. Similarly, the output bus 77 connects to drive operating devices such as solenoids and motor starters on the work station machinery. In this manner, the operation of the linear motor positioning system is coordinated with the operation of other machinery in the fabricating system. A 12-bit data word is read from the parallel input port 76 when an INPUT PORT control line 79 is active, and a 12-bit data word is written to the output port 76 when an OUT PORT control line 80 is active.

Referring still to FIG. 5, the control lines which activate the above-described input and output circuits are driven by a parallel interface circuit 81. The parallel interface circuit 81 is comprised of three IM6101 parallel interface elements manufactured by Intersil, Inc. These devices provide a universal means for interfacing peripheral equipment and circuits with the IM6100 microprocessor 50. The parallel interface circuit 81 is connected to the microprocessor 50 through a number of control lines, which are indicated collectively as control bus 82. The parallel interface circuit 81 is operable in response to the input/output transfer instructions (IOT) generated by the microprocessor 50 to activate any one of the above-described control lines leading to the input and output circuits. In addition, it is responsive to the signals on the RCR FLG and XMR FLG control lines 73 and 74 to set internal flags and it is responsive to an interrupt request signal generated by a real time clock 83 to request an interrupt from the microprocessor 50. When an interrupt is then granted, the parallel interface circuit 81 generates the address vector needed to locate the proper interrupt service routine in the read-only memory 53.

The detailed operation of the microprocessor 50, and the manner in which it functions with the parallel interface circuit 81 and memories 53 and 57 is described in the Intersil, Inc. publication "Intersil IM6100 CMOS 12 Bit Microprocessor".

Referring particularly to FIG. 5, the position control system operates the a.c. motor drive in response to motion commands which form part of a control program 125 stored in the read/write memory 57. The creation of this control program 125 as well as its execution is performed by the microprocessor 50 under the direction of machine language instructions stored in the read-only memory 53. These machine language instructions are formed into two main programs; a foreground program which is executed every 5.5 milliseconds, and a background program.

Figure 7A:
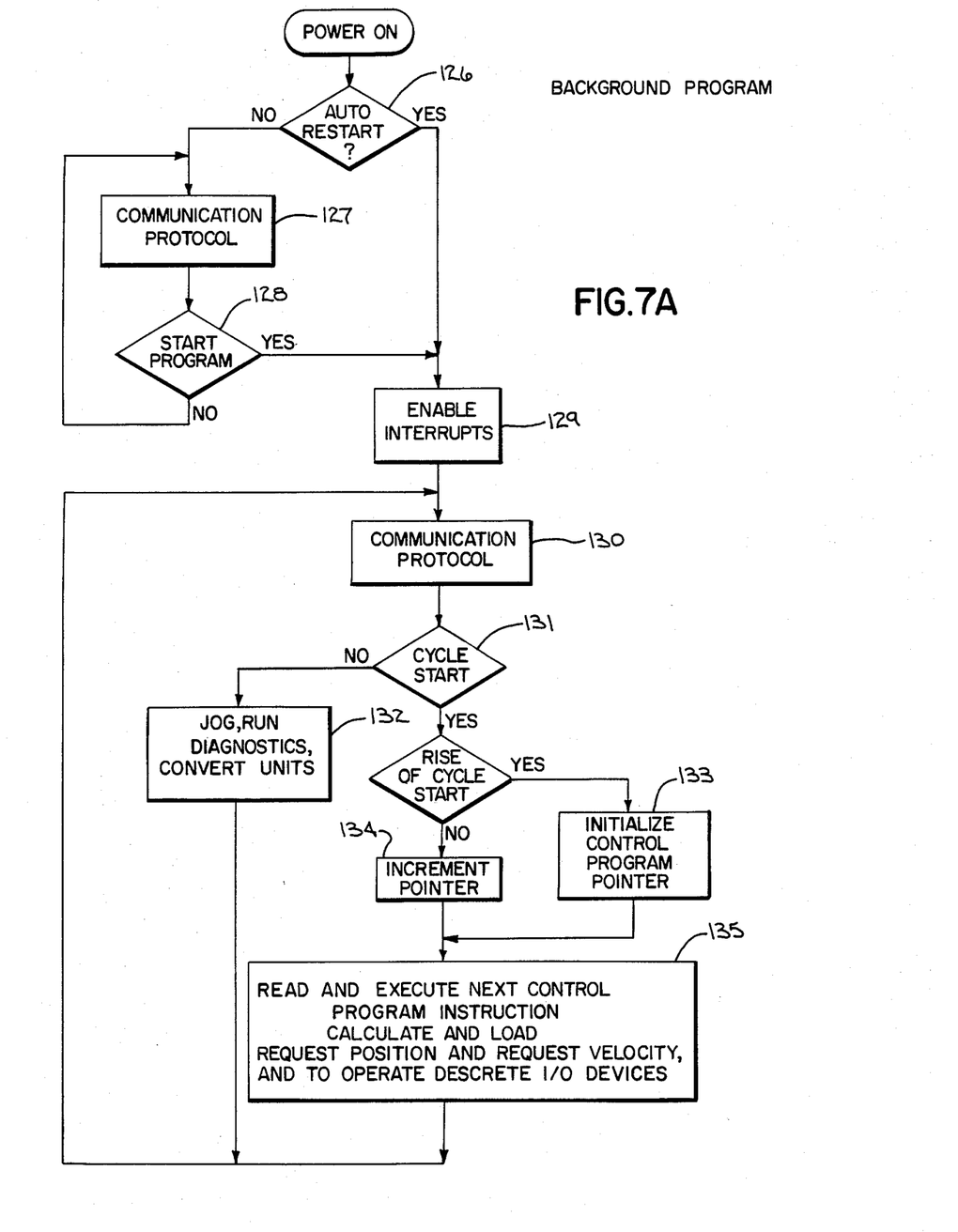

Referring particularly to FIGS. 5 and 7A, when power is turned on the background program is entered and a test is made at decision block 126 to determine if the automatic start switch is set. If not, the control program is not in the desired condition for execution and the system branches to a communication protocal program indicated by process block 127. The communication program 127 enables the user to enter instructions into the control program 125 and edit them using the programming panel 12 or 20. This interactive process continues until a start command is entered, as detected at decision block 128. The foreground program is then started by enabling all interrupts as indicated by process block 129.

The background program includes two loops, and the communications protocol program is included in both loops as indicated by process block 130. This enables the user to enter data or make further changes in the control program 125. A cycle start pushbutton is then tested as indicated by decision block 131 to determine if the control program 125 is to be executed. If not, the system branches to routines indicated by process block 132 which enable the system to run diagnostics, convert units and perform manual jog motions. Otherwise, a pointer is initialized, as indicated by process block 133, to read the first instruction from the stored control program. On subsequent cycles this pointer is incremented, as indicated by process block 134, and in either case the next control program instruction is read out of the memory 57.

The control program instructions are executed in sequence to carry out motion commands and to operate discrete I/O devices connected to the input/output port 76. As indicated by process block 135, the motion commands are employed to calculate a "request position" number which is stored in the RAM memory 57 for use by the foreground program. Similarly, a "request velocity" number is calculated and stored. The background program may at this point go into a wait loop in which it examines the "actual position" number stored in the RAM 57 and waits until it corresponds to the request position number, or it may loop back immediately to read and execute the next control program instruction.

Figure 7B:
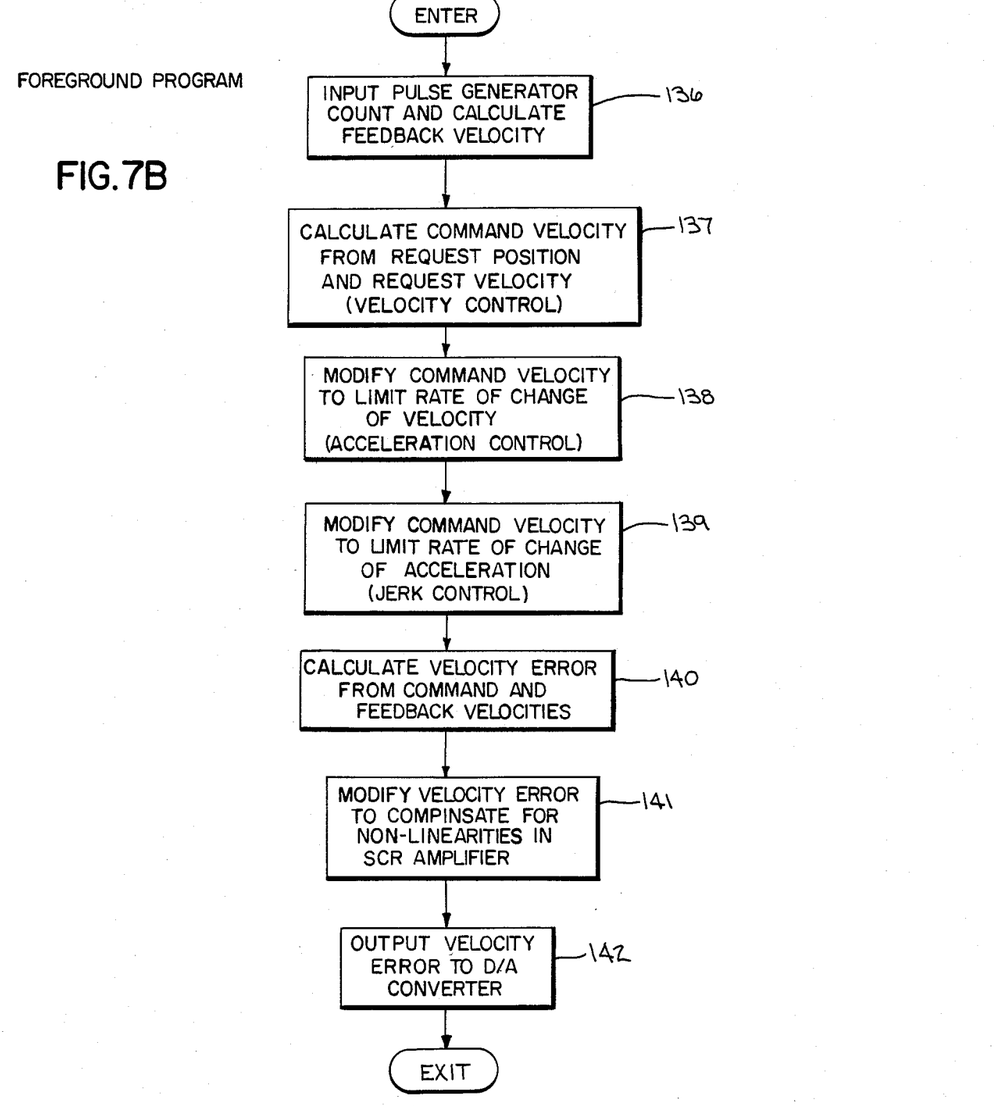

Referring particularly to FIGS. 5 and 7B, the foreground program is executed every 5.5 milliseconds when the real time clock 83 generates an interrupt. As indicated by process block 136, the count from the pulse generator interface circuit 63 is input and subtracted from its previous count to provide a distance moved in the previous 5.5 milliseconds. This number is a velocity feedback signal and it is an incremental position feedback signal which is employed to calculate actual position. As indicated by process block 137 a new command velocity number is then calculated using the requested velocity number calculated by the background program. The command velocity is also the distance which the machine is to travel over the next 5.5 millisecond time interval, and when the requested position is approached, the command velocity may be reduced to provide accurate positioning.

In addition to controlling the position and velocity of the fabricating material, the control also limits the acceleration and the rate of change of acceleration (jerk) of the fabricating material. As indicated by process block 138, this is accomplished by insuring that the command velocity will not produce an excessive change in velocity over that indicated by the velocity feedback number (1 commanded velocity—current velocity 1 acceleration limit). Similarly, as indicated by process block 139, the rate of change of acceleration is calculated and the command velocity is altered if necessary to keep the rate of change of acceleration, or jerk, within acceptable limits.

The velocity error is then calculated by taking the difference between the actual velocity and the commanded velocity as indicated by process block 140. Modifications to this velocity error number are then made as indicated by process block 141 to account for non-linearities in the a.c. motor drive 8 or 18 and the linear motors 6, 7 or 16. The resulting compensated velocity error number is linearly proportional to the force which the motors exert on the fabricating material, and this number is output to the D/A converter 65, as indicated by process block 142. As will now be explained, this velocity error number serves to directly control the current supplied by the a.c. motor drive to the linear motor stator windings. Velocity is thus indirectly controlled since the driving force produced by the linear motor is a function of armature current and fabricating material speed, and the speed of the fabricating material through the stator windings is dependent on this force.

Referring particularly to FIGS. 1 and 2, the a.c. motor drives 8 and 18 receive the velocity error signal from the position control systems 9 and 19 and alter the speed at which the fabricating material is driven by the linear motor. There are numerous a.c. motor drives known in the art which will accomplish this objective. For example, variable frequency a.c. motor drives using pulse width modulation techniques, or cycloconverters may be employed to control the speed of the fabricating material. In the preferred embodiment, however, a three-phase current control strategy is employed.

Figure 6:
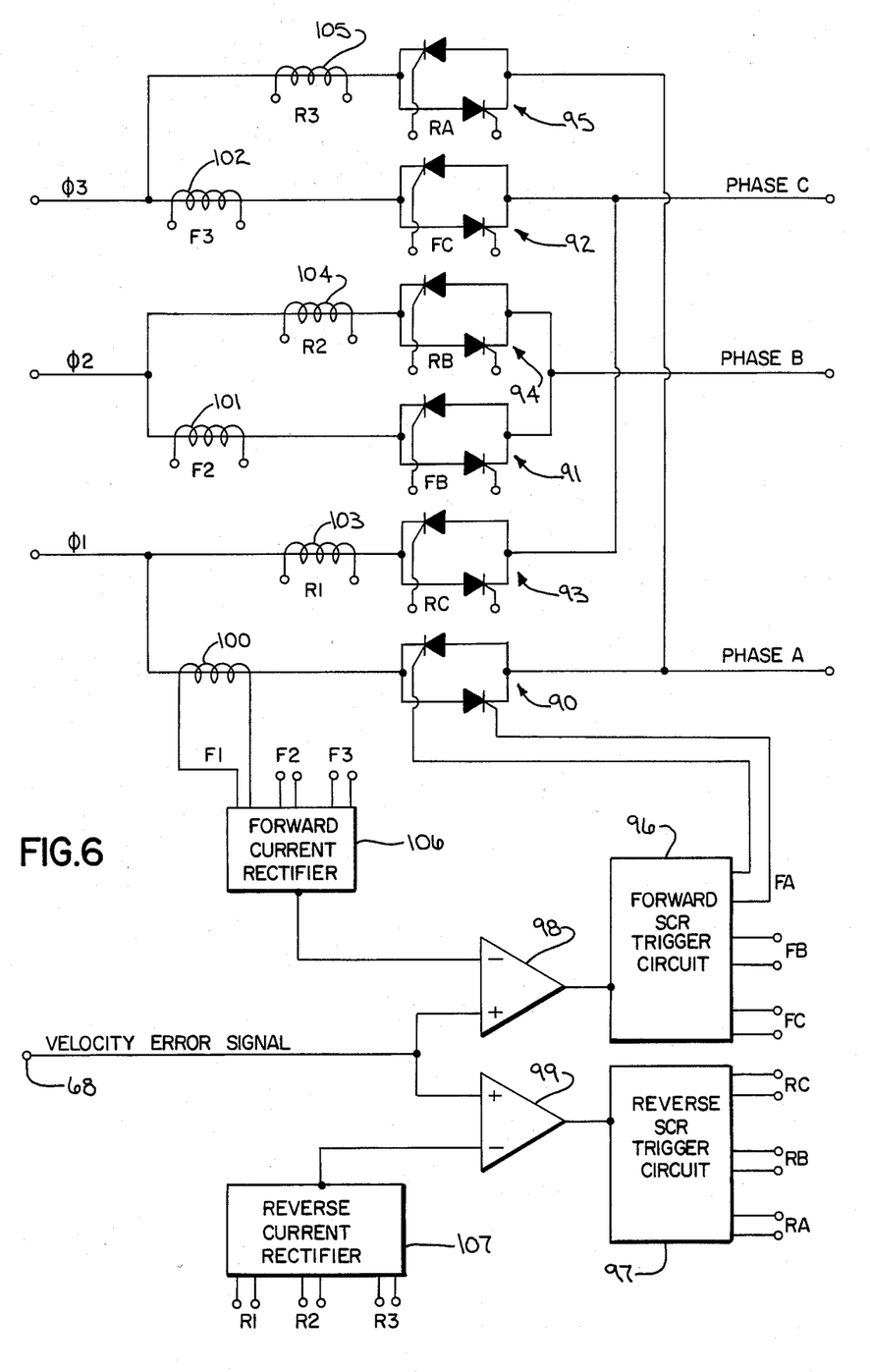
FIG. 6 is a schematic diagram of the a.c. motor drive which forms part of the systems of FIGS. 1 and 2.

Referring particularly to FIG. 6, the three voltage waveforms (phases A, B and C) applied to the linear motors 6, 7 and 16 are generated by six pairs of silicon controlled rectifiers (SCRs). Three SCR pairs 90, 91 and 92 are operable when the driving force generated by the linear motor is directed in the forward direction, and three SCR pairs 93, 94 and 95 are operable when generating a reverse force. Each of the SCR pairs 90–95 are driven by one of the three power line phases $\phi 1$, $\phi 2$ or $\phi 3$ and they are controlled by either a forward or reverse SCR trigger circuit 96 or 97. The SCR trigger circuits 96 and 97 each receive a current error signal from respective error amplifiers 98 and 99.

A variable-delay timing circuit in each trigger circuit 96 and 97 is responsive to the current error signal to control the firing of the SCRs 90–95. When the current error signal is large, the delay periods of the timing currents are short and the SCRs 90–95 are fired early during each cycle of the power line voltages $\phi 1$, $\phi 2$ and $\phi 3$. This allows a larger portion of each power line cycle to be applied to the linear motor stator windings, and a larger stator winding current results. The larger current induces a greater driving force in the fabricating material, and this in turn increases velocity. The SCR pairs 90–95 are phased back to apply less of the power-line voltage waveforms to the linear motor when propelling force is to be reduced. Thus, fabricating material velocity is controlled by controlling the magnitude and phase order of current supplied to the linear motors 6, 7 and 16.

Average stator current is sensed by a set of six current transformers. Three current transformers 100, 101 and 102 sense the current flowing through the forward SCR pairs 90, 91 and 92, and three current transformers 103, 104 and 105 sense the current flowing through the reverse SCR pairs 93, 94 and 95. The output signals from the current transformers 100–102 are applied to a forward current rectifier circuit 106 and the outputs of transformers 103–105 are applied to a reverse current rectifier circuit 107. The circuits 106 and 107 rectify and sum the signals received from the current transformers and they provide current feedback signals which are applied to the respective error amplifiers 98 and 99. An inner, stator winding current control loop is thus formed which is responsive to the polarity and magnitude of the velocity error signal received from the position control system 9 or 19. That is, the velocity error signal output by the position control is a current command signal which is compared with the current feedback signal in the amplifiers 98 and 99. The resulting output signal is the current error signal which controls the firing of the SCRs 90–95.

It should be apparent to those skilled in the art that numerous variations can be made to the preferred embodiments described herein without departing from the spirit of the invention. For example, many types of positioning controls are known in the art. These vary considerably in their hardware architecture and in the features which they offer. In addition, numerous a.c. motor drive circuits which enable motor speed to be controlled are known to the art and may be easily employed in the present invention. For example, in addition to controlling the current applied to the stator windings of the linear motor, the frequency of the applied current can be varied as a function of velocity to improve the efficiency of the motor and reduce the amount of heat generated.

| Component Appendix | |
|---|---|
| microprocessor 50 | CMOS 12-bit microprocessor manufactured by Intersil, Inc. as IM 6100 |
| address register 54, 58 | two, hex D-type flip-flop circuits manufactured by Texas Instruments, Inc. as 74LS174. |
| read-only memory 53 | three, 2K × 4 bipolar PROMS manufactured by Signetics, Inc. as N82S185 |
| read/write memory 57 | three, 1K × 4 RAM devices manufactured by National Semiconductor, Inc. as NMC6514J-9 |
| flip-flop 59 | two cross coupled 74LS37 NAND gates |
| parallel interface circuit 81 | three, CMOS parallel interface elements manufactured by Intersil, Inc. as IM6101. |
| D/A converter 65 | CMOS 12-bit D/A converted manufactured by National Semiconductor, Inc. as DAC1218LCD |
| UART 69 | CMOS UART manufactured by Intersil, Inc. as IM6402 |
| Parallel I/O port 76 | two, CMOS Hex D-type flip-flops CD40174 and two octal buffers 74LS244 |
| Pulse Generator Interface 63 | Three, 4-bit up/down counters manufactured by Texas Instruments, Inc. as 74LS193. |

We claim:

1. A drive system for positioning a fabricating material in a work station, the combination comprising:
stationary stator windings positioned adjacent the fabricating material and being operable when supplied with polyphase current to induce current in the fabricating material producing a force which propels the fabricating material into the work station;
a motor drive circuit connected to the stator windings and being operable to supply polyphase current to the stator windings which produce a propelling force having a magnitude that is determined by the magnitude of a command signal;
a position sensor for generating a position feedback signal which indicates the motion of the fabricating material; and
a position control circuit connected to receive the position feedback signal and being operable in response thereto to generate the command signal to the motor drive circuit, wherein the position control circuit generates a command signal which drives the fabricating material to a commanded position.

2. The drive system as recited in claim 1 in which the direction of the propelling force on the fabricating material is reversible by changing the polarity of the command signal applied to the motor drive circuit.

3. The drive system as recited in claim 1 in which the magnitude of the command signal generated by the position control circuit is a signal which is indicative of a commanded velocity.

4. The drive system as recited in claim 1 in which the fabricating material is sheet metal and the stationary stator windings are positioned adjacent one surface of the sheet metal at the input side of the work station.

5. The drive system as recited in claim 4 in which the stator windings are disposed in slots formed between teeth which extend across the width of the sheet metal, and in which these teeth form part of a magnetic circuit that directs the magnetic flux generated by the stator windings into the sheet metal.

6. The drive system as recited in claim 4 in which a second stationary stator winding is driven by the motor drive circuit and is positioned adjacent the other surface of the sheet metal substantially opposite the first stationary stator windings, such that the magnetic flux generated by the two stationary stator windings are substantially additive to increase the propelling force induced in the fabricating material.

7. The drive system as recited in claim 1 in which the stationary stator windings completely encircle the fabricating material, and the stationary stator windings are mounted adjacent one another and disposed along a length of the fabricating material.

8. The drive system as recited in claim 7 in which the stationary stator windings are positioned at the input to the work station.

9. A drive system for positioning a fabricating material in a work station, the combination comprising:
a position sensor mounted adjacent the fabricating material as it enters the work station and being operable to generate a position feedback signal which indicates the distance which the fabricating material moves;
a position control circuit connected to receive the position feedback signal, and being operable in response to the position feedback signal and a velocity profile defined by a stored control program, to generate a velocity signal which indicates the velocity at which the fabricating material is to be moved;
a motor drive circuit connected to receive the velocity signal and being operable in response thereto to generate polyphase currents; and
a set of stator windings, each stator winding being connected to receive a respective one of the polyphase currents generated by the motor drive circuit and the stator windings being positioned adjacent the fabricating material to produce a moving magnetic field which induces a current in the fabricating material and which thereby produces a force for propelling the fabricating material to a position indicated by said stored control program.

10. The drive system as recited in claim 9 in which the fabricating material is sheet metal and the set of stationary windings are positioned adjacent to one of the surfaces of the sheet metal as it is fed into the work station.

11. The drive system as recited in claim 9 in which each stator winding encircles the fabricating material and the stator windings are positioned adjacent to one another along a portion of the length of the fabricating material as the fabricating material is fed into the work station.

12. The drive system as recited in claim 9 in which the position control circuit includes means for altering the velocity signal to control the acceleration and deceleration of the fabricating material.

13. The drive system as recited in claim 9 in which the motor drive circuit controls the magnitude of the polyphase currents in response to the received velocity signal.

14. The drive system as recited in claim 13 in which the motor drive circuit includes means for sensing the magnitude of the current flowing in the stator windings and to provde a current feedback signal, and in which the motor drive circuit controls the current in the stator windings in response to both the velocity signal and the current feedback signal.

* * * * *

UNITED STATES PATENT AND TRADEMARK OFFICE
CERTIFICATE OF CORRECTION

PATENT NO. : 4,491,777
DATED : January 1, 1985
INVENTOR(S) : Thomas L. Beck et al It is certified that error appears in the above—identified patent and that said Letters Patent is hereby corrected as shown below:

| | |
|---|---|
| Column 3, line 29, | change "Figs. 7A-7C" to -- Figs. 7A-7B -- |
| Column 5, line 33, | change "$\tau 2Fp$" to -- $2F\tau p$ -- |
| Column 9, line 45, | delete "resulting compensated" |
| Column 9, | delete lines 46 and 47 |
| Column 9, line 48, | delete "rial, and this number is output to the D/A" and insert in its place -- linearization process block 141 insures that the force which the motor exerts on the fabricating material is linearly proportional to the velocity error number which is calculated by the process block 140. It is this "compensated" velocity error number which is output to the D/A -- |

UNITED STATES PATENT AND TRADEMARK OFFICE
CERTIFICATE OF CORRECTION

PATENT NO. : 4,491,777  PAGE 2 OF 2
DATED : January 1, 1985
INVENTOR(S) : Thomas L. Beck et al It is certified that error appears in the above—identified patent and that said Letters Patent is hereby corrected as shown below:

Column 10, line 24, change "increases" to --changes its--

Column 12, Claim 9,
Line 28, change "velocity" to -- command --

Column 12, Claim 9,
Lines 31, 32, change "velocity" to -- command --

Column 12, Claim 12,
Line 55, change "velocity" to -- command --

Column 12, Claim 13,
Line 59, change "velocity" to -- command --

Column 12, Claim 14,
Line 64, change "provde" to -- provide --

Column 12, Claim 14,
Line 66, change "velocity" to -- command --

Signed and Sealed this

Twenty-seventh Day of August 1985

[SEAL]

Attest:

DONALD J. QUIGG

Attesting Officer  Acting Commissioner of Patents and Trademarks